United States Patent
Sundgren et al.

(10) Patent No.: US 7,115,176 B2
(45) Date of Patent: Oct. 3, 2006

(54) PRODUCTION PROCESS AND PRODUCTION LINE FOR MANUFACTURING ARTICLES FROM HARDENABLE METAL MATERIALS

(75) Inventors: Anders Sundgren, Sunderbyn (SE); Göran Berglund, Gammelstad (SE); Mats Lindberg, Luleå (SE)

(73) Assignee: Accra Teknik AB, Ojebyn (SE)

( * ) Notice: Subject to any disclaimer, the term of this patent is extended or adjusted under 35 U.S.C. 154(b) by 255 days.

(21) Appl. No.: 10/398,007

(22) PCT Filed: Oct. 11, 2001

(86) PCT No.: PCT/SE01/02214

§ 371 (c)(1),
(2), (4) Date: May 7, 2003

(87) PCT Pub. No.: WO02/33132

PCT Pub. Date: Apr. 25, 2002

(65) Prior Publication Data

US 2003/0178108 A1    Sep. 25, 2003

(30) Foreign Application Priority Data

Oct. 19, 2000    (SE)    .................................. 0003781

(51) Int. Cl.
*C21D 9/08*    (2006.01)

(52) U.S. Cl. .................. 148/585; 148/594; 148/656; 266/127

(58) Field of Classification Search .............. 148/585, 148/594, 656
See application file for complete search history.

(56) References Cited

U.S. PATENT DOCUMENTS

| 3,054,177 | A | * | 9/1962 | Duhamel ..................... 72/254 |
| 3,890,106 | A | * | 6/1975 | Miller ....................... 285/390 |
| 4,414,042 | A | | 11/1983 | Gross et al. |
| 6,102,472 | A | * | 8/2000 | Wallstrom ............. 296/203.01 |
| 6,454,884 | B1 | * | 9/2002 | McNulty et al. ........... 148/520 |
| 6,811,622 | B1 | * | 11/2004 | Friederich et al. .......... 148/326 |

FOREIGN PATENT DOCUMENTS

WO    WO 9216665    10/1992

* cited by examiner

*Primary Examiner*—George Wyszomierski
(74) *Attorney, Agent, or Firm*—Ware, Fressola, Van der Sluys & Adolphson LLP

(57) ABSTRACT

In a method of manufacturing articles (8) in hardenable metal materials, a shaped workpiece (5.1, 5.2) with closed cross-section is hardened. The hardened workpiece (5.1, 5.2) is separated into at least two parts, where each part constitutes one shaped open cross-section. The invention also concerns a manufacturing process and a production line for the manufacture of articles (8) in hardenable metal materials.

10 Claims, 3 Drawing Sheets

PRODUCTION PROCESS AND PRODUCTION LINE FOR MANUFACTURING ARTICLES FROM HARDENABLE METAL MATERIALS

CROSS-REFERENCE TO RELATED APPLICATIONS

This application is a U.S. national phase filing under 35 U.S.C. § 371 of PCT/SE01/02214 filed Oct. 11, 2001, which PCT application claims foreign priority from Swedish Patent Application No. 0003781-2 filed Oct. 19, 2000.

BACKGROUND OF THE INVENTION

1. Technical Field

The present invention concerns a method of manufacturing articles in hardenable metal material. The invention also concerns a manufacturing process and a production line.

2. Description of the Background Art

At present, many structural articles are products manufactured in the form of or based on components, details and/or blanks that are manufactured in material that can be processed and shaped in different ways and thereafter hardened by heating and subsequent quenching. The materials used are mainly iron and steel alloy or other metals. If the article after shaping has an open cross-section, then the hardening process comprising heating and quenching will exert great strain on the article. Stress often arises in the material and gives rise to deformations that are difficult to reduce. At present, the hardened article with open cross-section must often be straightened or reshaped in other suitable ways in order to be utilized. If the tolerances on shape are narrow, this will result in many hardened articles being discarded as seconds or being destroyed.

If the heating takes place in an arrangement containing an inductor and the articles have an open cross-section then the heat distribution within the articles will not be optimum. In turn, this will result in an uneven hardenature distribution in each article, which leads to additional risks of material strain arising.

SUMMARY OF THE INVENTION

The object of the present invention is to achieve a method of manufacturing articles in hardenable material that, amongst other things, will solve the aforesaid problems. The method according to the present invention comprising the steps of:
(a) providing a shaped workpiece which closed cross-section;
(b) hardening the shaped workpiece to create a hardened workpiece; and
(c) dividing the hardened workpiece into at least two parts, where each part constitutes one shaped and hardened article with an open cross-section.

The invention also concerns a manufacturing process and a production line which implement the method.

Central to the method according to the present invention is to avoid articles with open cross-sections when hardening. This is possible by producing and shaping a workpiece with a closed cross-section prior to hardening, hardening the workpiece with the closed cross-section and, subsequent to hardening, dividing the workpiece into parts with open cross-section that have been shaped and hardened. From these parts is obtained the hardened articles of the desired shape. The workpiece with its closed cross-section is relatively stable and its shape does not change to the same extent as an open profile under hardening. A workpiece with closed cross-section also facilitates the distribution of heat throughout the material during induction heating, which further improves the hardening.

BRIEF DESCRIPTION OF THE DRAWINGS

The method according to the present invention is described below with references to some embodiments shown in the attached figures. Articles and parts with the same denomination and function included in different objects have been given the same reference designation but with a suffix to identify the specific object to which they belong.

DETAILED DESCRIPTION OF THE INVENTION

Figure 1:
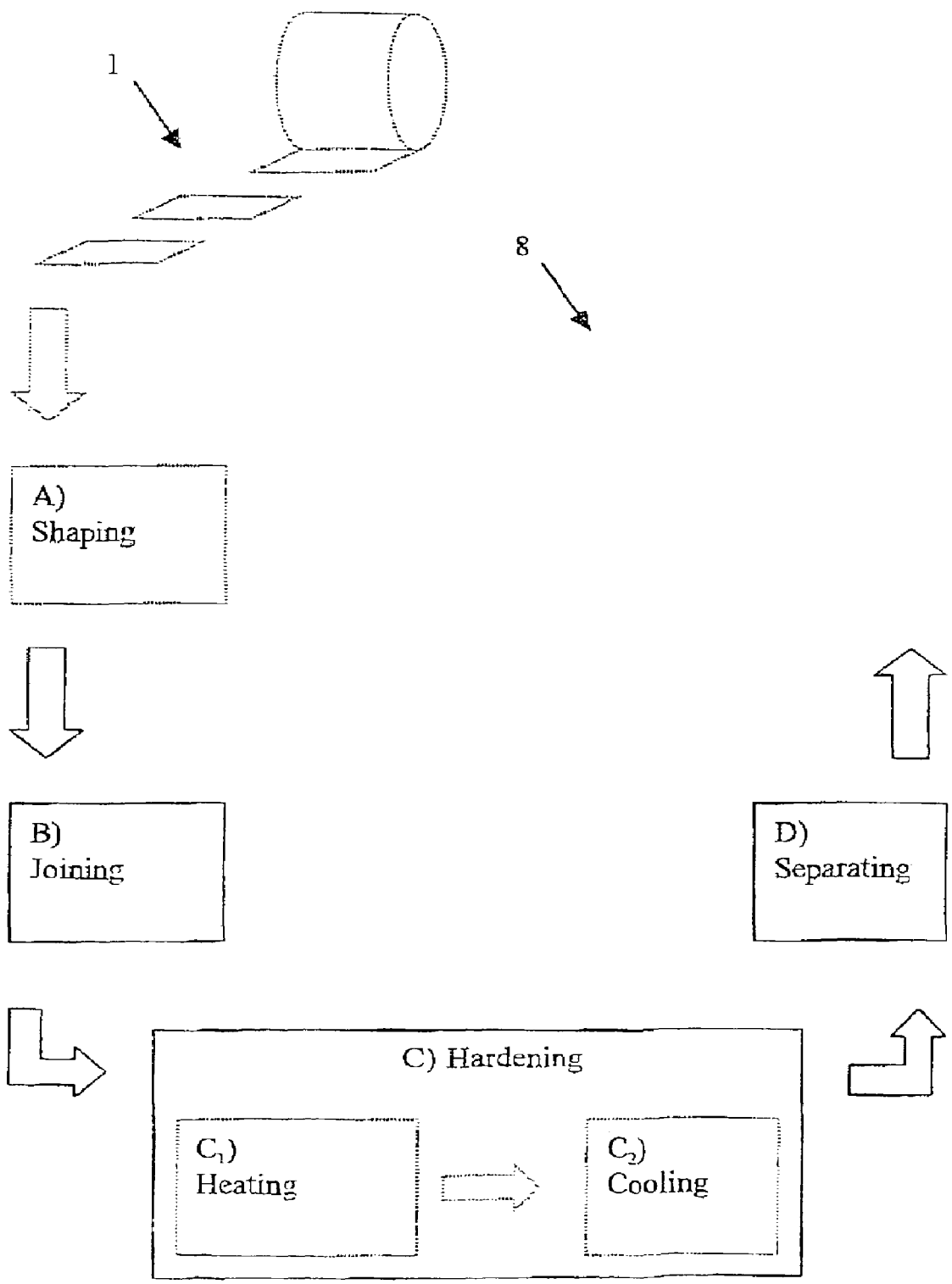
FIG. 1 illustrates, in a schematic way, a process for manufacturing articles in hardenable material where the method according to the present invention is employed.

The method according to the present invention can be integrated as one part, or actually as several parts, of a manufacturing process (see FIG. 1). Such a manufacturing process may well include a shaping step A, a joining step B, a hardening step C and a separating step D. The hardening step C normally includes a heating step $C_1$ and a cooling step $C_2$.

The manufacturing process can be divided into the steps A–D in distinctly individual workstations. Certain steps are so independent of the previous and/or the subsequent step that the work being carried out in these steps can be carried out in a different place and at another time. All or some of the steps A–D in the manufacturing process in combination can also constitute a more continuous line production.

Each process step requires at least one specific arrangement for the work/processing that is to be carried out at each step. The work being carried out in several process steps can be done in the same arrangement if it is possible to coordinate several functions in one arrangement. It would be suitable to arrange the process steps in series if production is to be automated. The arrangements that enable this method in the manufacturing process form a production line.

Production is based on blanks 1 (see FIG. 1) that can be machined, shaped and hardened by heating and quenching, preferably iron and steel alloy or other metals. The blanks 1 are of a size and shape that is suitable for the chosen method of shaping and the associated means for shaping The blanks 1 are in the form of plate or strip.

Figure 2:
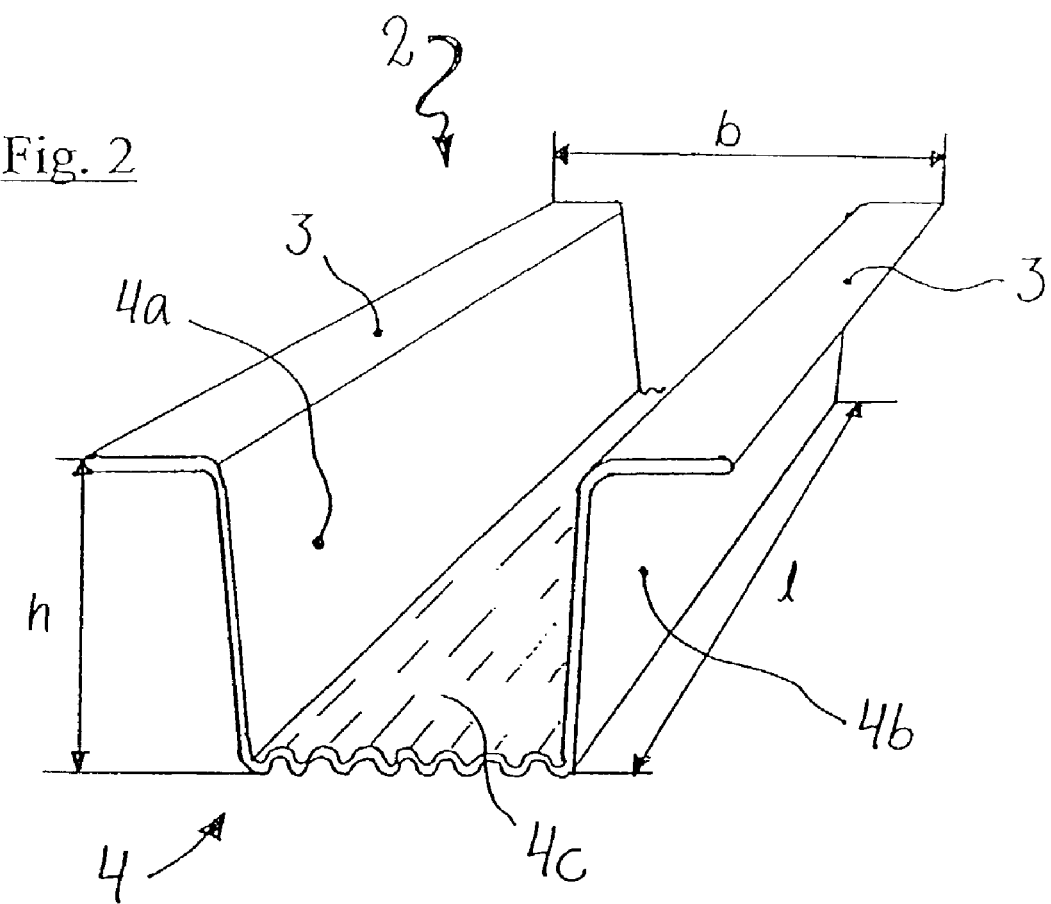
FIG. 2 illustrates a perspective view of a shaped sectional element.

The first operation for obtaining a workpiece with closed cross-section is to shape the blanks 1 in the shaping step A into sectional elements 2 (FIG. 2). If the blanks 1 are in metal plate, they are fed or placed into the means for shaping. Before shaping A, the plates are of a breadth and length that results in a sectional element 2 with the determined and required dimensions after shaping A. If the blanks 1 are in metal strip, they can either be cut into plates before shaping A or a continuous-feed shaped section of strip can be cut into suitable lengths after shaping A. Shaping takes place in a rolling mill. Roll forming can be complemented or replaced with another method of shaping, such as pressing. The design of the means for shaping is previously known and is not described here in detail, nor is it shown in detail in the figures.

Each sectional element 2 has three dimensions with a length l, a breadth b and a height h (see FIG. 2). The sectional element 2 is principally continuous with a length l that is greater than both the breadth b and the height h. The ratio of breadth b and height h is optional. Other ratios between the lengths of the sides are possible however.

Each sectional element 2 includes two flanges 3 running lengthwise and forming the outer parts of the sectional element. Each flange 3 is principally flat or includes flat areas.

The sectional element 2 also includes a shaped middle section 4 that is mainly U or C-shaped. The middle section 4 has three walls, where two sides 4a and 4b are connected to each other with a middle piece 4c. The middle piece 4c is corrugated. The other sides 4a and 4b can also be fluted, folded or have other types of material shaping (not shown in figures). The middle section 4 is joined to a flange 3 on each side.

Figure 3:
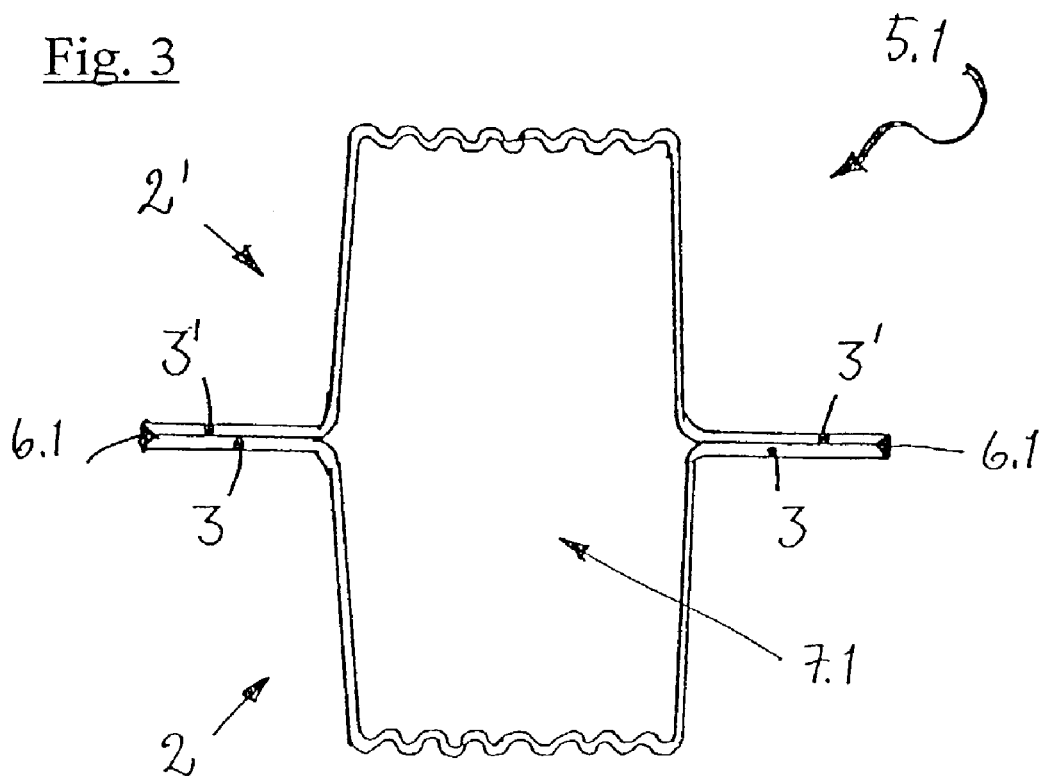
FIG. 3 illustrates an end view of two sectional elements that have been placed together and joined to form one workpiece for hardening.

In the joining step B after shaping A, the two sectional elements 2 and 2' are joined together to form one workpiece 5.1 (see FIG. 3). The sectional elements 2 and 2' are placed together in such a way that the flanges 3 on one element are touching the corresponding flanges 3' on the second element. The flat area/areas on each flange touch the flat area/areas on the opposite flange.

The flanges 3 and 3' are fastened to each other by a means for fastening previously known, such as welding. The flanges are welded as far out as is possible and suitable on the flat areas. The workpiece 5.1 then obtains stiffening welded joints 6.1 on each outside edge of two opposing and joined flanges 3 and 3' lengthwise along the sectional element/workpiece. The workpiece 5.1 now has a hollow closed cross-section 7.1 (see FIG. 3).

After the joining step B, the workpiece 5.1 is hardened in the hardening step C where it is heated during the heating step $C_1$ by a means for heating. (The design of the means for heating is previously known and is not described here in detail, nor is it shown in detail in the figures.) The workpiece 5.1 is heated to a hardening hardenature that is suitable for the material in question. A suitable hardenature for boron steel, for example, is around 900° C. After heating, the workpiece 5.1 is quenched in a cooling stage $C_2$. The workpiece 5.1 is then transferred from the means for heating to a means for cooling. (The design of the means for cooling is also previously known and is not described here in detail, nor is it shown in detail in the figures.) Heating and cooling can take place in a continuous process where the means for heating is connected to the means for cooling in such a way that the workpiece 5.1 is able to pass these two means after each other through a continuous feed. This can be achieved automatically. The means for heating and the means for cooling can alternatively be combined in one means to form a means for hardening where all the steps in the hardening operation C, including the hardening steps $C_1$, and $C_2$, take place in one and the same means, even without the need to move the workpiece 5.1.

Once the workpiece 5.1 is hardened after heading $C_1$ and cooling $C_2$, the welded joints 6.1 are removed so that the two sectional elements 2 and 2' are separated in the separation step D of the process. The welded joints 6.1 can suitably be cut away, which will cause a loss of part of the flanges 3 and 3'. The flanges 3 and 3' must therefore be slightly oversize after the shaping step A, so that the shaped and hardened sectional elements 8 (see FIG. 1), constituting the final product, will exhibit the required dimensions. The degree of oversize principally corresponds to the amount of material that will be cut off the sectional elements 2 and 2' during the separation process D. The flanges 3 and 3' on the sectional elements 2 and 2' when they are only shaped is consequently wider than they eventually will be in their final shaped and hardened form. The closer to each edge that the welded joint is placed, the less material loss will arise.

The welded joints 6.1 have assisted in supporting, stiffening, the workpiece 5.1, and thereby the two sectional elements 2 and 2', during hardening C. The shape of sectional elements 2 and 2' are thereby less distorted than they would be if they had passed the hardening process individually as two sectional elements with open cross-section.

In order to facilitate the joining step B, the sectional elements 2 and 2' can be shaped and fed from two parallel means for shaping so that the sectional elements 2 and 2' directly after shaping are combined in the required way with the flanges 3 and 3' facing each other It is naturally possible to join more than two sectional elements to obtain a workpiece with a closed cross-section. These shaped sectional elements and especially the flanges may need to be another shape than when only two sectional elements are joined together. For instance, it may be necessary to angle the flanges in relation to the sides of the middle section of each sectional element. The actual sectional elements may have another shape than the one described above as long as they have an open cross-section.

Figure 4:
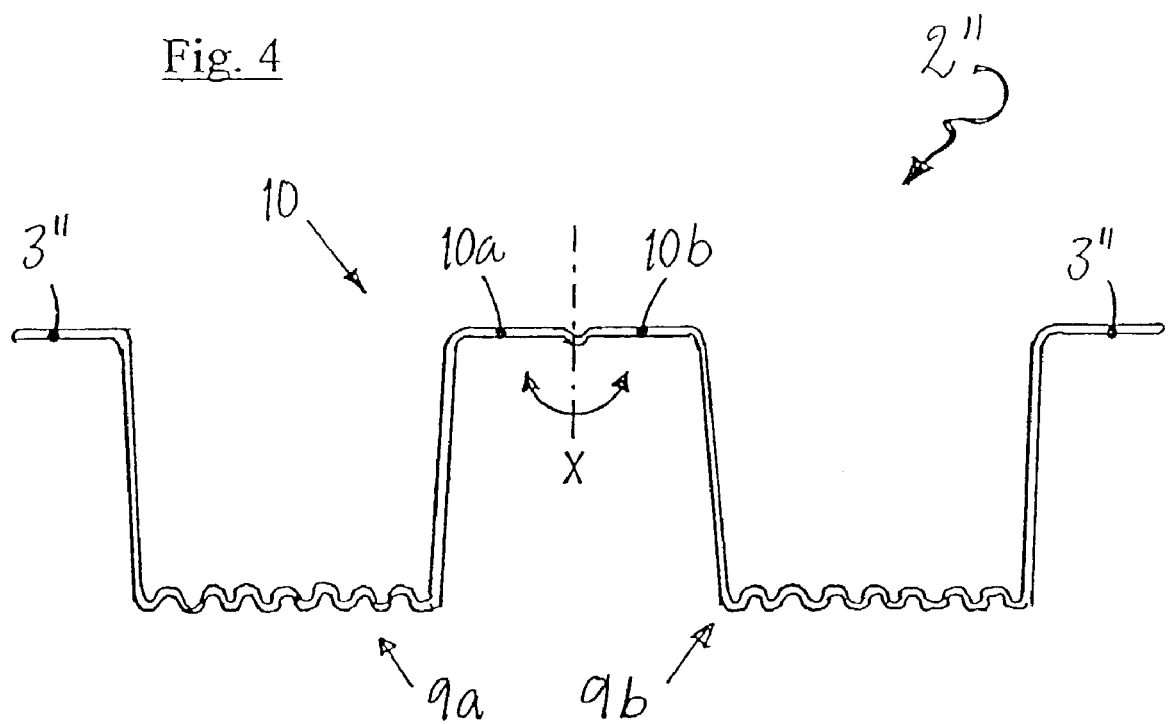
FIG. 4 illustrates an end view of another shaped sectional element.

Another method is to shape the blanks 1 in the shaping step A to a sectional element 2" with open cross-section including two principally C or U-shaped parts 9a and 9b joined together with a web 10 (see FIG. 4). The web includes two parts 10a and 10b that form a flange located on each side of the longitudinal axis X of the web 10. Along its longitudinal axis X, the web can have a notch in the material (not shown in the figures). The sectional element 2" also has flanges 3" on each outer long side parallel with the longitudinal axis X of the web.

Figure 5:
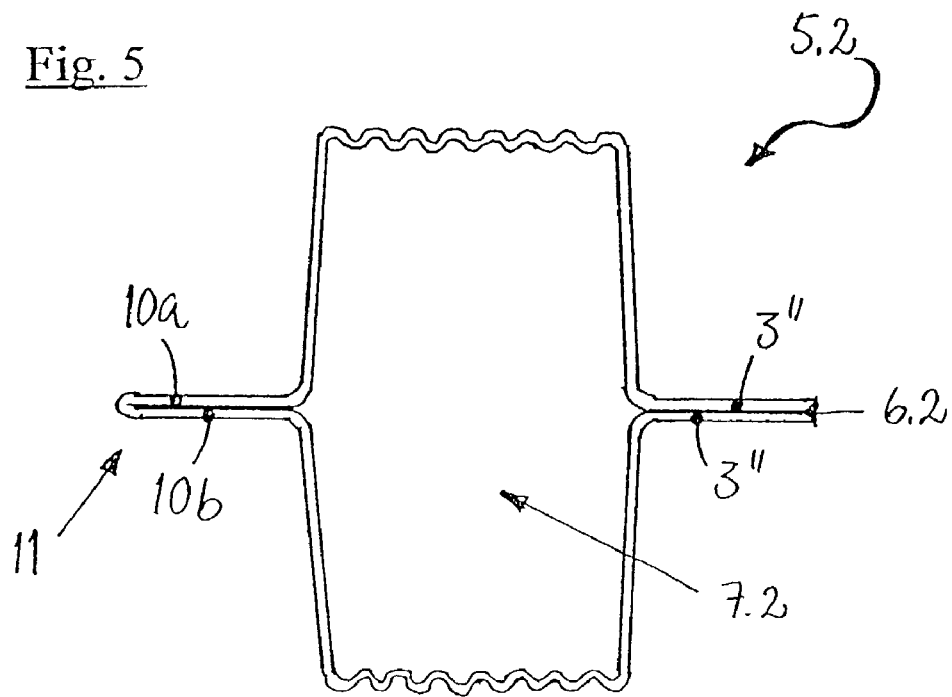
FIG. 5 illustrates an end view of the sectional element of FIG. 4 that has been folded and joined and thereby forms one workpiece for hardening.

The sectional element 2" is bent/folded along the longitudinal axis X so that the outer flanges 3" of the sectional element make contact with each other. At the same time, the two parts 10a and 10b that form flanges will also make contact with each other. The two C or U-shaped parts 9a and 9b will then be opposite each other, forming one body with hollow closed cross-section 7.2 (see FIG. 5).

If the sectional element 2" is roll formed, this bending can take place during the shaping step A. It is also possible to attain this bending with another means for shaping, such as pressing. The flanges 3" are joined together in the joining step B as previously described to form one workpiece 5.2. This workpiece 5.2 has one welded joint 6.2 along the flanges 3" on one side and a material fold 11 on the opposite side. The side of the workpiece with the material fold 11 can be reinforced with a welded joint similar to the one on the flanges 3". The workpiece 5.2 now has a hollow closed cross-section 7.2 (see FIG. 5).

The hardening step C follows, in which the workpiece 5.2 is hardened as previously described. This is followed by the separation step D, where the welded joint 6.2 and the outermost part of the material fold 11 are removed. If the material fold 11 is reinforced with a weld, then this is also removed. Removal can be made by means for cutting, gas-cutting or clipping. The degree of oversize of the flanges 3" and the parts 12a and 12b forming a flange corresponds to the amount of material to be removed. The flanges 3" and the web 10 and the parts 12a and 12b forming flanges after shaping are consequently wider than they are to be in the final shaped and hardened sectional element 8. Finally, after separation, two shaped and hardened sectional elements 8 are obtained for subsequent use. It is principally the C or U-shaped parts 9a and 9b, parts of the web 10 and the flanges 3" that form the final sectional element 8.

Of course, it is possible to shape the sectional element 2" by other methods. The sectional element 2" can include more than two principally C or U-shaped parts 9, where each parallel shaped part is joined to the adjacent shaped part via a web 10. whereby the number of webs on each sectional element 2" is more than one. The flanges 3" and the web 10 may require another shape and the bend in each web used to form the workpiece must be less than in the aforesaid case with only one coincident web. The webs can be pinched together, at least at each place where the material is folded, and given a welded joint in order to obtain the stiffening effect required from the welded joint.

All the described flanges 3, 3' and 3" can be fitted with shaped parts used to provide an interlocking effect, such as through a snap fastening. The flanges can also be fastened to each other in other ways.

Induction hardening is facilitated if the article being hardened has a closed cross-section. For induction hardening, the means for heating can be designed in such a way that the article passes through an induction coil. If the sides of the article match the shape of the coil interior, as is the case with the present invention, the heat will be more evenly distributed, whereby the risk of material stress will be reduced.

The production rate increases as more than one sectional element is hardened at one time in the hardening process. As at least two sectional elements can be hardened at the same time instead of only one at a time, the production rate can be doubled during the actual hardening. It is also possible to increase the production rate even further by joining more than two sectional elements 2 and 2' as described above or by shaping the sectional element 2" in such a way that the hardened workpiece 5.2 can be divided into more than two shaped and hardened sectional elements.

The present invention can be used for the manufacture and production of beams, structural girders, such as vehicle members.

This description of the present invention is not to be regarded as a limitation of the invention but only as an example to facilitate comprehension of the invention. Adaptations of different parts in relation to other component parts, choice of material, size adjustments, shape adjustments, replacement parts and articles and everything else that is evident or presents itself immediately to a skilled person can naturally be carried out within the scope of the invention.

The invention claimed is:

1. Method of manufacturing articles of hardenable metal materials comprising the steps of:
   (a) providing a shaped workpiece with closed cross-section;
   (b) hardening the shaped workpiece to create a hardened workpiece by heating and subsequent quenching; and
   (c) dividing the hardened workpiece longitudinally into at least two parts, where each part constitutes one shaped and hardened article with an open cross-section.

2. Method according to claim 1, wherein each shaped and hardened article constitutes one sectional element.

3. Method according to claim 1, wherein at least two shaped sectional elements with open cross-section are placed against each other and joined to provide the shaped workpiece with closed cross-section, the hardened workpiece is separated after hardening so that at least two shaped and hardened articles are obtained.

4. Method according to claim 3, wherein joining is achieved by welding.

5. Method according to claim 1, wherein, during the providing step, a shaped sectional element with open cross-section including at least two longitudinally shaped parts interconnected by a web is folded along a longitudinal axis in the web, the outer sides of the sectional element, parallel to the longitudinal axis of the web, are joined together, whereby the shaped workpiece with closed cross-section is obtained and the hardened workpiece is separated after hardening to form at least two shaped and hardened articles with open cross-section.

6. Method according to claim 5, wherein joining is achieved by welding.

7. Manufacturing process for the manufacture of articles of hardenable metal materials, comprising the following steps in the order named:
   (a) hardening a shaped workpiece with closed cross-section by heating and subsequent quenching; and
   (b) separating the shaped workpiece longitudinally into at least two parts, where each part constitutes one shaped and hardened article with open cross-section.

8. Manufacturing process according to claim 7, further including the step of joining together at least two shaped sectional elements with open cross-section situated opposite each other to obtain the shaped workpiece with closed cross-section.

9. Manufacturing process according to claim 7, further including the steps of:
   (a) providing a shaped sectional element having an open cross-section and including at least two longitudinal shaped parts interconnected by a web;
   (b) folding the sectional element along a longitudinal axis in the web so that outer sides of the sectional element are parallel with the longitudinal axis of the web; and
   (c) joining the outer sides to obtain the shaped workpiece with closed cross-section.

10. Production line for the manufacture of articles of hardenable metal materials comprising:
   (a) means for joining shaped sectional elements to obtain a workpiece;
   (b) means for hardening the workpiece by heating and subsequent quenching, the means for hardening following the means for joining; and
   (c) means for dividing the workpiece longitudinally into at least two parts, where each part constitutes one shaped and hardened article with open cross-section, and the means for dividing being immediately adjacent the means for hardening so that the work performed by the means for hardening and the means for dividing is carried out sequentially.

* * * * *